March 12, 1968 — M. M. CONN — 3,373,312
SOLENOID ACTUATED AUTOMOBILE HEADLIGHT SWITCH
Filed April 1, 1966
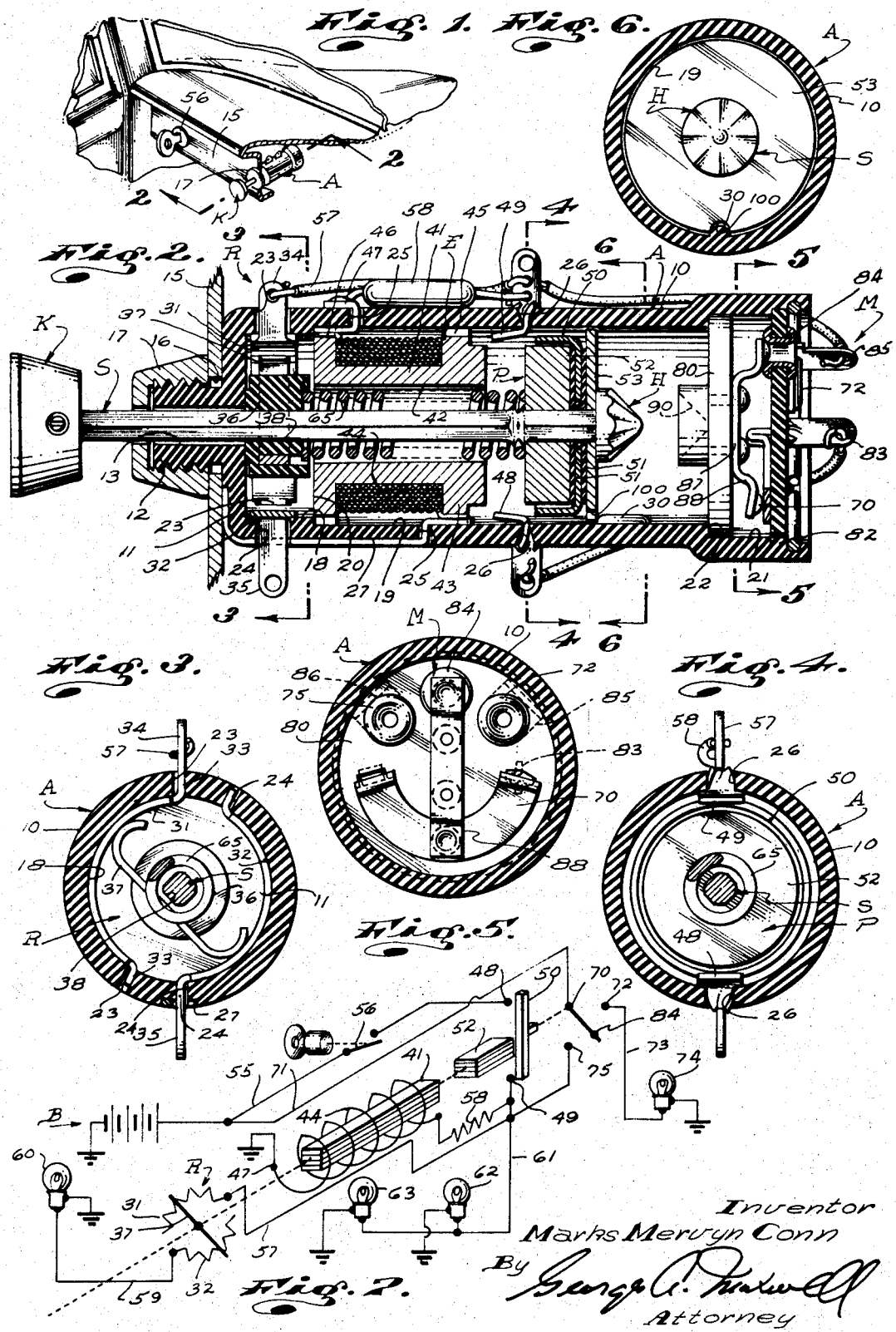
Inventor
Marks Mervyn Conn
By George A. Maxwell
Attorney 3,373,312
SOLENOID ACTUATED AUTOMOBILE
HEADLIGHT SWITCH
Marks Mervyn Conn, 2319 Chariton,
Los Angeles, Calif. 90034
Filed Apr. 1, 1966, Ser. No. 539,389
9 Claims. (Cl. 315—83)

ABSTRACT OF THE DISCLOSURE

A solenoid actuated automobile headlight switch including an elongate body with front and rear ends, an elongate shaft extending arranged parallel with the body with a forward portion projecting forwardly beyond the forward end of the body, said shaft being shiftable axially between front and normal rear positions, a primary contact carried by the body, a first power line, a power source and a normally open auto ignition switch, said first power line extending between the power source and the primary contact, said ignition switch being arranged in said power line to control the flow of power therethrough, a secondary contact carried by the body, suitably grounded head lamps, a second power line connected between the secondary contact and the head and tail lamps, a connector carried by the shaft to establish connection between the primary and secondary contacts when the shaft is in its front position, an electro magnet carried by the body and having a core and a coil about the core, said coil having a primary lead grounded and a secondary lead connected with the second power line, a ferrous mass carried by the shaft to occur rearward of the electro magnet when the shaft is in its rear position and to engage the magnet core when the shaft is in its front position, and spring means related to and normally yieldingly urging the shaft to its rear position.

---

This invention relates to a switch to control the lights of an automobile or other similar vehicle and is more particularly concerned with a switch which normally automatically turns the lights or the vehicle off when the ignition switch of the automobile is turned off (opened) and the engine of the vehicle is stopped.

The ordinary motor vehicle is provided with a special and peculiar light system. The light systems ordinarily include head and tail lights or lamps and dashboard lamps, all of which are energized or turned on when the automobile is operated at night or when, due to the early or late hours of the day, or other adverse conditions, ambient light is insufficient and safety dictates that the lamps provided be energized.

In addition to the above, the ordinary light system of vehicles include parking lights adapted to be energized when the automobile is parked in a location or under conditions where warning of its presence should be given to others.

All of the above-noted lamps or lights are under control of a master "headlamp switch," which switch is mounted in the instrument panel in the automobile and in convenient proximity to the driver's seat or station.

In addition to the above, the lighting systems ordinarily provided in vehicles include stop lights, associated with the taillights, turn indicator lights, associated with the stop lights and parking lights, and so-called courtesy lights within the passenger compartment and adapted to be energized when an access door, or the like is opened or by means of manually operable switches within the compartment. This latter-mentioned group of lights, while related to a common circuit with the first mentioned group of lights, that is, the head, tail, dash and parking lights, is not under direct control of the headlamp switch, but is controlled by a plurality of independent switches related to mechanical devices for automatic, intermittent actuation.

The lighting system of an automobile is supplied with electric power or energy from a dynamo electric machine driven by the vehicle engine, when said engine is in operation.

When the engine of the vehicle is not in operation, the lighting system draws power from a storage battery provided for limited energization of the lighting system, the operation of appliances, such as radios, and for energizing a starter motor provided for the engine.

The greatest strain on the storage battery of an automobile is operation of the starter motor. The second greatest drain on the storage battery of an automobile is energization of the bright and powerful headlamps and tail lamps.

In the ordinary operation of an automobile, care must be taken not to energize the lighting system and other electrical appliances, when the engine is not in operation, for such a period of time or to such an extent as will drain the storage battery to such an extent that sufficient power to operate the starter motor for the engine is no longer available.

Unfortunately, through inadvertence, accident or mistake, an overwhelming number of automobile operators, from time to time, leave the headlamps of their automobiles energized, when parking and leaving the automobiles inoperative, with the result that when they return to their automobiles, they find that the battery is drained or dead and without sufficient power to start the engine. The disadvantages and inconveniences experienced as a result of such a power failure are many and are believed to be so obvious and apparent as not to merit mentioning at this time.

As a result of the above, the prior art has provided several electrical safety or automatic shut-off devices adapted to be engaged in the lighting circuitry of an automobile and which serve to open the lighting circuit when the engine is stopped, so that the headlamps cannot be inadvertently left to burn and thereby drain the battery. Such devices have been in the nature of independent or unitary components which represent a separate cost item and are such that they must be separately and especially installed in the automotive lighting circuitry with which they are related, adding to the manpower required to manufacture an automobile and further increasing the cost thereof.

Still further, certain of the automatic headlight or headlamp control devices provided by the prior art require extensive modification of the existing or conventional lighting circuitries and are such that they interrupt the circuit with which they are related to such an extent that the circuit is completely dead and the lights cannot be intentionally or deliberately turned on when the engine is not operating and when to so turn on the lights is necessary or desired.

Automotive headlamp switches have become substantially standardized in the manner in which they are mounted, in the manner in which they are connected in a lighting circuit, in dimensions and in the manner in which they are operated.

It has been determined that the manufacturers of such switches and similar electrical components are reluctant to provide and attempt to sell a separate control device for preventing vehicle operators from inadvertently leaving their headlamps burning, since the automobile manufacturers are extremely reluctant to further complicate and add to the cost of manufacturing their automobiles, as would result by the provision of such independent control devices in the lighting systems of their automobiles.

It has been further determined that should an automotive headlamp switch of substantially standard or conventional dimensions, having conventional mounting means and coupling means and requiring substantially conventional operating procedures, but also including an automatic shut-off means, be provided, automobile manufacturers would not be hesitant to purchase and include such switches in their prdoucts. Accordingly, a manufacturer of such switches would not hesitate to undertake the manufacture and sale of such a switch.

Therefore, it is an object of my invention to provide a headlamp switch having means to normally automatically break the circuit to the head and tail lamps of the automobile, when the automobile is put out of service.

It is an object of this invention to provide a switch of the character referred to in which the means to break the circuit is under control of the ignition switch to or for the automobile engine.

Yet another object of my invention is to provide a switch of the character referred to which is such that the lamps normally under control of the shut-off means can be energized, when said means is operated to de-energize the lamps, by special manipulation of the switching structure.

It is an object of the present invention to provide a switch of the character referred to selectively turn the head and taillights and the dashboard lights on and off, while under control of the automatic shut-off means and independently of said shut-off means, and to selectively turn on and off the parking lights of the vehicle.

It is another object of the present invention to provide a switch structure of the character referred to having a rheostat to control the intensity of the instrument panel lamp or lamps, in accordance with common practice.

It is yet another object of my invention to provide a switch structure of the character referred to which is manually operated in substantially the same manner as a conventional headlamp switch, which is of substantially the same size and shape and which is mounted in the same manner as a conventional headlamp switch.

It is yet another object to provide a switch structure of the character referred to which is adapted to be connected with and related to a conventional headlamp circuit of an automobile without extensive or complicated modification thereof.

Finally, it is an object of this invention to provide a switch which is easy and economical to manufacture and to install and a switch which is safe, durable and dependable in operation.

The above and other objects and features of my invention will be fully understood from the following detailed description of a typical preferred form and carrying out of my invention, throughout which description reference is made to the accompanying drawings, in which:

FIG. 1 is a perspective view of a portion of the instrument panel of an automobile, with my new switch related thereto;

FIG. 2 is an enlarged, detailed sectional view of my new switch structure, taken substantially as indicated by line 2—2 on FIG. 1;

FIG. 3 is a sectional view taken as indicated by line 3—3 on FIG. 2;

FIG. 4 is a sectional view taken as indicated by line 4—4 on FIG. 2;

FIG. 5 is a sectional view taken as indicated by line 5—5 on FIG. 2;

FIG. 6 is a sectional view taken as indicated by line 6—6 on FIG. 2; and

FIG. 7 is a circuit diagram of my new invention.

The switch which I provide and which is illustrated in the accompanying drawings, while classified or commonly referred to as an "automotive headlamp switch," in addition to controlling the headlamps which are the primary lamps of a motor vehicle, also controls the tail lamps, instrument panel lamps, and parking lamps of the automobile with which the switch is related.

The ordinary automotive headlamp switch is operated by means of an elongate shaft with an operating knob at one end, accessible at the instrument panel of the vehicle. The shaft is axially shiftable to turn the head and tail lamps and the instrument panel lamp of the vehicle on and off, is rotatable to vary the intensity of or brightness of the instrument panel lamps and is also either rotatable or axially shiftable to turn the parking lamps of the vehicle on and off, when the other above-mentioned lamps are turned off.

The switch construction that I provide is similar in operation with the ordinary headlamp switch as set forth above, is similar in size and exterior configuration, and is similar in hook-up with the ordinary or conventional headlamp switch. That is, it includes a similar number of contact posts to connect with the wiring circuitry of an automobile and is connected with said circuitry in a conventional manner.

Accordingly, my new switch construction and resulting new lamp circuit is adapted to be substituted for conventional headlamp switches in conventional automotive lighting circuits.

The switch includes an elongate tubular body A having a longitudinally extending cylindrical side wall 10, a radially extending front wall 11, closing the front end of the body, and having a central, forwardly projecting, externally threaded neck 12 with a centrally longitudinally extending shaft-receiving opening 13.

The rear end 14 of the body is open. The front end of the body is adapted to be arranged adjacent to the rear surface of an instrument panel 15, in axial alignment with an opening 16 therein and with the front surface of the front wall 11 in flat bearing engagement with said panel and with the neck 12 on the body projecting forwardly through the opening 16.

A clamp ring 17 is threaded onto and about the neck 12 to engage the front surface of the panel 15 and serves to hold the body in tight clamped or fixed relationship with said panel.

The rearwardly opening body A defines a rearwardly opening, cylindrical front or primary socket 18 in the forward end portion of the body and having its bottom or forward end closed by the front wall 11, a central, secondary socket 19 larger than the primary socket 18 and having a forward or bottom end communicating with the primary socket and defining a rearwardly disposed, annular stop shoulder 20, and a third, rear socket 21, larger than the secondary socket 19 and having a forward or bottom end communicating with the secondary socket and defining a rearwardly disposed annular stop shoulder 22.

The portion of the side wall 10 defining the primary socket 18 is provided with two circumferentially spaced pairs of longitudinally extending, radially inwardly and outwardly opening, front and rear slot-like contact openings 23 and 24.

The portion of the side wall 10 defining the central socket 19 is provided with two longitudinally spaced pairs of circumferentially spaced, circumferentially extending slot-like contact openings 25 and 26.

The exterior of the side wall 10 is provided with a contract channel 27 extending from one of the openings 25 and continuing about and terminating in the front wall 11 of the body.

The third or rear socket 21 is provided with a counterbore in its rear end defining an annular rearwardly disposed stop shoulder 28, spaced rearward of the bottom or stop shoulder 22 of the socket.

The counterbore is provided with an annular, radially inwardly opening snap-ring groove 29, spaced rearward of the stop shoulder 28.

The interior wall or bore of the central socket is further provided with an elongate, longitudinally extending, radially inwardly projecting guide member or key 30 in the rear portion thereof, rearward of the rear openings 26 therein.

The body illustrated in the drawings and described above is a unitary structure cast or molded of a suitable dielectric material, such as Bakelite.

The primary socket 18 is adapted to receive and house a rheostat R to control the brightness of the instrument panel lamps of the vehicle with which the switch structure is related.

The rheostat R includes a pair of circumferentially spaced, radially inwardly disposed, arcuate contacts 31 and 32. The contacts 31 and 32 are established of resilient metal ribbon stock and extend between the pairs of openings 23 and 24 respectively.

The ends of the contacts 31 and 32 are provided with radially outwardly turned tabs 33 at their opposite ends, which tabs project into the openings 23 and 24 in the body.

One of the tabs 33 on the contact 31 is extended to establish a radially outwardly projecting primary contact post 34 at the exterior of the body and a tab on the other contact 32 is extended to establish a radially outwardly projecting secondary contact post 35 at the exterior of the body and spaced circumferentially from the post 34.

The rheostat R further includes a cylindrical rotor 36 of dielectric material arranged concentrically in the socket 18 and carrying an elongate contact brush 37, the opposite ends of which project radially outwardly from the rotor and establish sliding contact on or with the contacts 31 and 32.

The rotor 36 is provided with a central, longitudinal, polygonal opening 38 through which a polygonal shaft S is engaged for free longitudinal shifting and for rotary drive.

The shaft S extends through the opening 13 in the neck on the body, through the socket 18 and into and through the major longitudinal extent of the socket 19.

The shaft S is provided with a manually engageable knob K releasably engaged on its forward end and is provided with an enlarged head H at its rear end.

The rotor 36 of the rheostat R normally establishes running bearing engagement on the rear surface of the front wall 11 of the body A.

Arranged in the central socket 19 of the body is an electro-magnet E. The electro-magnet E includes an elongate, axially extending, annular, ferrous metal spool-type core 41, having a central bore 42 through which the shaft S freely projects. The core is provided with radially outwardly projecting flanges 43 at its opposite ends and carries a coil or winding 44 about its exterior and between said end flanges. The end flanges are provided with circumferentially spaced, radially outwardly opening notches 45, one of which receives the lead end 46 of the winding 44 related thereto. The notches 45 are spaced circumferentially about the flanges in the same longitudinal radial planes as the openings 25 in the side wall 10 of the body.

The core 41 is press-fitted into the socket 19 and is seated on the stop shoulder 20 thereof.

A U-shaped primary contact 47 is engaged through one opening 25 and has one leg within the socket 19 to occur within a notch 45 in the core and to contact the lead 46 engaged in that notch.

A secondary contact 48, in the form of a ribbon strip is engaged through the other opening 25 in the side wall of the body. The contact 47 has a rear end portion within the socket to enter a notch 45 in the core and to contact the other lead in of the coil 41 and has a forward portion, at the exterior of the body, which portion extends longitudinally forward, within the channel 27 in the body and terminates at the front wall 11 of the body to establish ground contact with the adjacent surface of the instrument panel with which the switch structure is related.

Arranged in the socket 19, rearward of the electro-magnet E, is a principal power switch P, which switch includes circumferentially spaced, primary and secondary contacts 48 and 49 and a coupler 50. The coupler 50 is adapted to extend between the contacts 48 and 49 and is shiftable axially into and out of engagement therewith.

The primary and secondary contacts 48 and 49 are engaged in or through the openings 26 in the body to be carried thereby and have forwardly and radially inwardly projecting resilient brush-like portions and radially outwardly projecting post portions.

The coupler 50 is shown as a metal cup-like part having an annular contact rim arranged within the socket 19 in axial alignment therewith and engageable with the contacts 48 and 49. The coupler 50 has a radially extending body at the rear end of the rim portion, which bottom has a central opening through which the shaft S freely extends.

The bottom of the coupler 50 is provided with insulating discs 51 of dielectric material, which discs occur adjacent the front and rear surfaces of said bottom. The coupler bottom and the discs 51 are held in tight clamped centered engagement between a cylindrical disc-shaped ferrous mass 52 arranged forward of the coupler and a flat radially extending disc-shaped plate or guide member 53, which mass and plate or guide member are carried on the rear end portion of the shaft S.

The plate or guide member 53 is stopped against the forward end of the enlarged head H on the shaft and the mass 52 is urged rearwardly into tight engagement with the laminate structure occurring rearward thereof and is fixed in position on the shaft by suitably staking said shaft, as clearly illustrated in the drawings.

The ferrous mass fixed on the shaft S is shiftable longitudinally in the body, with the shaft and the coupler 50, from a normal position, as shown, where it is spaced from the core 41 of the magnet E and where the coupler 50 is out of contact with the contacts 48 and 49; to a forward, actuated position, where the mass contacts the core and where the contacts 48 and 49 are engaged by the coupler 50.

The primary contact 48 is connected with a power source, such as a battery B, by means of a power line 55, in which the manually operable, on and off ignition switch 56 of the automobile circuitry, is engaged.

The secondary contact 49 is connected with the primary contact 31 of the rheostat R by a connector line 57, is connected with the primary contact 47 of the electro-magnet E by and through a resistor 58, whereby the current flow through and to the winding 44 of the magnet can be properly controlled.

The secondary contact 32 of the rheostat R is connected, through a line 59, to one contact of the instrument panel lamp 60. The other contact of said lamp is suitably grounded.

The secondary contact 49 of the switch P is also connected with a line 61 extending to and connected with the head and tail lamps 61 and 63. The lamps 62 and 63, like the lamp 60, are suitably grounded.

With the structure thus far described, it will be apparent that when the ignition switch 56 is closed and the switch P is closed by urging the coupler 50 forward, by means of the knob K and shaft S, the electro-magnet E is energized and holds the mass 52, which is then contacted with the core, in contact therewith. When the magnet is energized and the mass on the shaft is in contact therewith, the switch P is held and maintained closed, until the ignition switch 56 is opened, shutting off the supply of current to the magnet, or until the shaft and the mass thereon is manually urged rearward, away from the magnet and the switch P is opened.

When the switch P is closed, current is directed through the rheostat R to the instrument panel lamp 60. The current flow to the lamp 60 can be varied as circumstances require, by manual rotation of the knob K and resulting operation of the rheostat R.

Engaged about the shaft S and between the rotor 36 of the rheostat R and the mass 52 on the shaft S, and extending freely through the bore 42 of the electro-magnet core, is a compression spring 65.

The spring 65 normally yieldingly urges the mass 52, coupler 50 and shaft S rearwardly to its normal, neutral or unactuated position.

The spring 65 is of insufficient strength to overcome the holding effect of the magnet E with the mass 52, but is of sufficient strength to urge the mass 52, coupler 50 and shaft S rearwardly when the magnet is de-energized, as by opening the ignition switch 56.

The spring 65 is unstressed when the construction is in its normal position, as shown.

In addition to the foregoing, the switch construction that I provide includes a three-position, manually operated rotary switch means M. The switch means M has a primary contact 70 connected with the power line 55 ahead of the ignition switch 56, by a line 71; a first secondary contact 72 connected with a line 73 extending from the parking lamp or lamps 74 of the vehicle, and a second secondary contact 75 connected with the secondary contact 49 of the switch P, or the line 61 extending from the contact 49.

The switch means M includes a rotary disc 80 of dielectric material seated on the bottom or stop shoulder 22 of the third, rear socket 21 in the body, for free rotation. Spaced forward of the rotor disc 80 and seated on the stop shoulder 28 in the socket 21, is a carrier disc 81 of dielectric material and held in fixed seated engagement on said shoulder 28 by a snap ring 82 engaged in the groove 29 in said socket.

The primary contact 70 is shown as an axially inwardly disposed, flat, arcuate metal part arranged adjacent the inner surface of the disc 81, concentric therewith. The ends of the contact 70 are bent forwardly to establish circumferentially spaced stops at the ends of the contact and are then bent rearwardly to extend through openings provided in the disc, where they are suitably bent to secure the contact in position on said disc. One of the rearwardly projecting ends is suitably extended to establish a contact post 83.

The secondary contacts 72 and 75, and an intermediate dead contact 84 are carried by the disc 81 in circumferential spaced relationship with the ends of the primary contact 70 and with each other.

The contacts 72, 75 and 84 are shown as metal grummet type contacts engaged through the disc. The grummets establishing the contacts 72 and 78 engage and secure suitable rearwardly projecting posts 85 and 86 to the disc.

The rotor 80 carries a suitable U-shaped contact 87, which contact can be secured to the rotor in any suitable manner. The contact 87 has radially outwardly and axially rearwardly projecting resilient contact arms 88 at each of its ends. The terminal ends of the arms 88 are provided with semi-spherical rearwardly projecting detents, one of which slidably engages the contact 70 related thereto and the other of which is shiftable into and out of seated engagement in the annular grummet type contacts 84, 72 and 75.

The rotary switch means M further includes releasable coupling means N between the shaft S and the rotor 80. In the case illustrated the means N includes a central, forwardly opening, rearwardly convergent, polygonal socket 90 in the front of the rotor 80 and a rearwardly projecting radially inwardly convergent polygonal rear end on the head H of the shaft S. The rear end of the head H is adapted to be shifted rearwardly into engagement in the socket 90 to establish rotary driving engagement with the rotor.

With the structure set forth above, it will be apparent that by urging the shaft S rearwardly from its normal position, the head H establishes driving engagement with the rotor 80 and that upon subsequent rotation of the shaft, the switch means M can be shifted from its normal position where the dead contact 84 is engaged by its related arm 88 of the contact 87 to selectively engage the contacts 72 and 75.

It is to be noted that when the contacts 72 or 75 are engaged by the arm 88 related thereto, the other arm 88 of the contact 87, engages the forwardly turned ends of the contact 70 and is stopped thereby.

The plate or guide member 52 carried by the shaft S is provided with a radially outwardly opening notch 100, which notch is in axial alignment with the key or projection 30 in the body A, when the head H is engaged with the rotor of the switch means M and said switch means M is in its neutral position, that is, when the dead contact 84 is engaged by its related contact arm 88.

When the notch 100 in the guide member is aligned with the key 30, the head H on the shaft S can be shifted freely rearwardly from its normal position to its rear position, or from its rear position to its normal position.

When the notch 100 is out of axial alignment with the key 30, the plate or guide member 53 and the shaft S and head H related thereto, cannot be shifted from its normal position to its rear position, or cannot be shifted from its rear position to its normal position, but is stopped against axial movement by the key or projection 30.

With the guide means established by the notched guide member and the projection or key, it will be apparent that the switch means M cannot be inadvertently left in one of those positions where lamps are energized, upon shifting the shaft S and head H, axially from its rear position to its normal position.

From the foregoing, it will be apparent that I have invented a novel switch structure which is easy and economical to manufacture, which is easy and convenient to install and which is highly effective and durable in operation.

Having described only a typical preferred form and application of my invention, I do not wish to be limited to the specific details herein set forth, but wish to reverse to myself any modifications and/or variations that may appear to those skilled in the art and which fall within the scope of the following claims.

Having described my invention, I claim:

1. An automotive head lamp switch including, an elongate body with front and rear ends, an elongate shaft arranged parallel with the body with a forward portion projecting forwardly beyond the forward end of the body, said shaft being shiftable axially between front and normal rear positions, a primary contact carried by the body, a first power line, a power source and a normally open auto ignition switch, said first power line extending between the power source and the primary contact, said ignition switch being arranged in said power line to control the flow of power therethrough, a secondary contact carried by the body, suitably grounded head lamps, a second power line connected between the secondary contact and the head and tail lamps, a connector carried by the shaft to establish connection between the primary and secondary contacts when the shaft is in its front position, an electromagnet carried by the body and having a core and a coil about the core, said coil having a primary lead grounded and a secondary lead connected with the second power line, a ferrous mass carried by the shaft to occur rearward of the electromagnet when the shaft is in its rear position and to engage the magnet core when the shaft is in its front position, spring means related to and normally yieldingly urging the shaft to its rear position, and a resistor in the secondary coil lead.

2. An automotive head lamp switch including, an elongate body with front and rear ends, an elongate shaft arranged parallel with the body with a forward portion projecting forwardly beyond the forward end of the body, said shaft being shiftable axially between front and normal rear position, a primary contact carried by the body, a first power line, a power source and a normally open auto ignition switch, said first power line extending between the power source and the primary contact, said ignition switch being arranged in said power line to control the flow of power therethrough, a secondary contact carried by the body, suitably grounded head lamps, a second power line connected between the secondary contact and the head and tail lamps, a connector carried by the shaft to establish connection between the primary and secondary contacts when the shaft is in its front position, an electromagnet carried by the body and having a core and a coil about the core, said coil having a primary lead grounded and a secondary lead connected with the second power line, a ferrous mass carried by the shaft to occur rearward of the electromagnet when the shaft is in its rear position and to engage the magnet core when the shaft is in its front position, spring means related to and normally yieldingly urging the shaft to its rear position, said body being a tubular member, said shaft arranged concentrically within the body and said core being a tubular member fixed within the body and through which the shaft freely projects.

3. A structure as set forth in claim 2 wherein, said primary and secondary contacts occur within the body in radial and circumferential spaced relationship about the shaft, said connector being a cup-like part of conductive material carried by the shaft in insulated relationship thereto and projecting radially from the shaft.

4. A structure as set forth in claim 1 wherein said body is a tubular member, said shaft is arranged concentrically within the body and said core is a tubular member fixed within the body and through which the shaft projects, said primary and secondary contacts occurring within the body in radial and circumferential spaced relationship about the shaft, said connector being a cup-like part of conductive material carried by the shaft in insulated relationship thereto and projecting radially from the shaft.

5. A structure as set forth in claim 2 including, suitably grounded instrument panel lamps and an instrument panel lamp control rheostat including primary and secondary arcuate contacts carried by the body forward of the electromagnet, a rotor on the shaft and carrying brushes to engage and connect the arcuate contacts, the primary arcuate contact connected with said secondary power line, said secondary arcuate contact connected with said instrument panel lamps, said shaft being rotatable.

6. A structure as set forth in claim 2 including, suitably grounded instrument panel lamps and an instrument panel lamp control rheostat including circumferentially spaced primary and secondary arcuate contacts carried by the body forward of the electromagnet, a rotor on the shaft and carrying brushes to engage and connect the arcuate contacts, the primary arcuate contact connected with said secondary power line, said secondary arcuate contact connected with said instrument panel lamps, said shaft being rotatable, said rotor engaged about the shaft for free relative axial shifting and arranged in bearing engagement with a portion of the body forward of said rotor, said spring means including a helical compression engaged about the shaft, through the core and between the rotor and ferrous mass.

7. A structure as set forth in claim 2 including, suitably grounded instrument panel lamps, and an instrument panel lamp control rheostat including circumferentially spaced primary and secondary arcuate contacts carried by the body forward of the electromagnet, a rotor on the shaft and carrying brushes to engage and connect with the arcuate contacts, the primary arcuate contact connected with said secondary power line, said secondary arcuate contact connected with the instrument panel lamps, said shaft being rotatable, and a three position rotary switch means spaced rearward of the connector and shaft including first, second, and third button contacts and a circumferential contact carried by the body at the rear end thereof and in circumferential spaced relationship relative to the axis of the shaft, a carrier plate rotatably carried by the body between the rear end of the shaft and the button and circumferential contacts and having a central forwardly opeing polygonal socket, an elongate contact arm carried by the carrier with one end slidingly contacting the circumferential contact and its other end selectively shiftable into engagement with the first, second, and third contacts, a polygonal head on the rear end of the shaft to enter and establish driving engagement in the socket upon axial rearward shifting of the shaft, a guide member carried by the shaft and having a radially outwardly opening notch, an inwardly projecting key in the body and in axial alignment with and engageable in said notch when said engaged head and carrier are in a rotative position where the arm engages said second button contact, said circumferential contact connected with the primary power line, said first button contact connected with said secondary contact and said third button contact connected with parking lamps which are suitably grounded.

8. A structure as set forth in claim 2 including, suitably grounded instrument panel lamps, and an instrument panel lamp control rheostat including primary and secondary circumferentially spaced arcuate contacts carried by the body forward of the electromagnet, a rotor on the shaft and carrying brushes to slidably engage and connect the arcuate contacts, the primary arcuate contact connected with said secondary power line, said secondary arcuate contact connected with the instrument panel lamps, said shaft being rotatable, and a three position rotary switch means rearward of the connector and shaft including circumferentially spaced first, second, and third button contacts and a circumferential contact carried by the body at the rear end thereof, a carrier plate rotatably carried by the body forward of the circumferentially spaced button and circumferential contacts and rearward of the rear end of the shaft and having a central forwardly opening polygonal socket in axial alignment with the shaft, an elongate contact arm carried by the carrier with one end slidably contacting the circumferential contact and its other end selectively shiftable into engagement with the first, second, and third contacts, a polygonal head on the rear end of the shaft to enter and establish driving engagement in the socket upon axial rearward shifting of the shaft, a guide member carried by the shaft and having a radially outwardly opening notch, an inwardly projecting key in the body in axial alignment with and engageable in said notch when said engaged head and carrier are in a rotative position where the arm engages said second button contact, said circumferential contact connected with the primary power line, said first button contact connected with said secondary contact and said third button contact connected with parking lamps which are suitably grounded, said rotor being engaged about the shaft for free relative axial shifting and for rotary driving engagement, said rotor establishing axial bearing engagement with a portion of the body forward of said rotor, said spring means including a helical compression engaged about the shaft, through the core and between the rotor and ferrous mass.

9. A structure as set forth in claim 2 including, suitably grounded instrument panel lamps, and an instrument panel lamp control rheostat including circumferentially spaced primary and secondary arcuate contacts carried by the body forward of the electromagnet, a rotor on the shaft and carrying brushes slidably engaging and connecting the arcuate contacts, the primary arcuate contact connected with said secondary power line, said secondary arcuate contact connected with said instrument panel lamps, said shaft being rotatable, and a three position rotary switch means rearward of the connector and shaft including, circumferentially spaced first, second, and third button contacts and a circumferential contact carried by the body at the rear end thereof, a carrier plate rotatably carried by the body rearward of the shaft and forward of the button and circumferential contacts and having a central forwardly opening polygonal socket, an elongate contact arm carried by the carrier and having one end slidably contacting the circumferential contact and its other end selectively shiftable into engagement with the first, second, and third button contacts, a polygonal head on the rear end of the shaft to enter and establish driving engagement in the socket upon axial rearward shifting of the shaft from its normal rear position, a disc-shaped guide member with front and rear bearing surfaces and carried by the shaft and having an axially and radially outwardly and axially opening notch, an elongate, axially extending, radially inwardly projecting key in the body with front and rear bearing ends and in axial alignment with and engageable in said notch when said engaged head and carrier are in a rotative position where the arm engages said second button contact, said front bearing end of said key slidably engaging the front bearing surface when the shaft is in its normal rear position, and said key is out of alignment with the notch, said rear bearing end of said key slidably engaging the rear bearing surface when said shaft is shifted rearward from its normal rear position and the notch is out of alignment with the key, said circumferential contact connected with the primary power line, said first button contact connected with said secondary contact and said third button contact connected with parking lamps which are suitably grounded, said rotor being engaged about the shaft for free relative axial shifting and for rotary driving engagement, said rotor establishing axial bearing engagement with a portion of the body forward of said rotor, said spring means including a compression engaged about the shaft, through the core and between the rotor and ferrous mass, and a resistor in the secondary coil lead.

References Cited

UNITED STATES PATENTS 2,177,618 10/1939 Montgomery ......... 315—83
3,125,702 3/1964 Herridge ........... 315—83 X

FOREIGN PATENTS 130,303 3/1929 Switzerland.

JAMES W. LAWRENCE, *Primary Examiner.*

STANLEY D. SCHLOSSER, *Examiner.*